(12) United States Patent
Epps et al.

(10) Patent No.: US 8,000,251 B2
(45) Date of Patent: Aug. 16, 2011

(54) INSTRUMENTING PACKET FLOWS

(75) Inventors: Garry Paul Epps, Sunnyvale, CA (US);
David Delano Ward, Somerset, WI (US); John H. W. Bettink, San Jose, CA (US); Christopher Yates Satterlee, Cupertino, CA (US); Mohammed Ismael Tatar, Kanata (CA); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 495 days.

(21) Appl. No.: 11/985,239

(22) Filed: Nov. 14, 2007

(65) Prior Publication Data

US 2009/0122805 A1 May 14, 2009

(51) Int. Cl.
*H04L 1/00* (2006.01)
*H04L 12/26* (2006.01)
*H04L 12/28* (2006.01)
*H04L 12/56* (2006.01)

(52) U.S. Cl. ......... 370/241; 370/252; 370/417; 370/418
(58) Field of Classification Search .................. 370/241, 370/252, 417, 419
See application file for complete search history.

(56) References Cited

U.S. PATENT DOCUMENTS

| | | | |
|---|---|---|---|
| 4,569,042 A | 2/1986 | Larson | |
| 5,485,457 A * | 1/1996 | Aramaki | 370/238 |
| 5,926,461 A | 7/1999 | Habermann et al. | |
| 6,012,096 A | 1/2000 | Link et al. | |
| 6,697,382 B1 | 2/2004 | Eatherton | |
| 6,798,742 B1 | 9/2004 | Mawhinney et al. | |
| 6,807,156 B1 | 10/2004 | Veres et al. | |
| 6,868,094 B1 | 3/2005 | Bordonaro et al. | |
| 6,976,087 B1 | 12/2005 | Westfall et al. | |
| 7,027,718 B1 * | 4/2006 | Ohishi et al. | 386/211 |
| 7,035,210 B2 | 4/2006 | Walles | |
| 7,111,073 B1 | 9/2006 | Jain et al. | |
| 7,768,937 B2 * | 8/2010 | Isambart et al. | 370/252 |
| 2004/0141527 A1 | 7/2004 | Bennett et al. | |
| 2005/0114793 A1 * | 5/2005 | Jung | 715/839 |
| 2006/0034188 A1 | 2/2006 | Oran et al. | |
| 2006/0104218 A1 | 5/2006 | Kako | |
| 2007/0168748 A1 | 7/2007 | Musoll | |

(Continued)

FOREIGN PATENT DOCUMENTS

EP    1 427 137 A2    6/2004

OTHER PUBLICATIONS

Lai et al., "A Framework for Internet Traffic Engineering Measurement," IETF Draft draft-ietf-tewg-measure-00.txt, ieft.org, Aug. 2001, 18 pages.

(Continued)

*Primary Examiner* — Chi H Pham
*Assistant Examiner* — Farah Faroul
(74) *Attorney, Agent, or Firm* — The Law Office of Kirk D. Williams

(57) ABSTRACT

Real-time customer packet traffic is instrumented to determine measured delays between two or more points along a path actually traveled by a packet, such as within or external to one or more packet switching devices. These measurements may include delays within a packet switching device other than the ingress and egress time of a packet. These measured delays can be used to determine whether or not the performance of a packet switching device or network meets desired levels, especially for complying with a Service Level Agreement.

19 Claims, 11 Drawing Sheets

EXAMPLE NETWORK

U.S. PATENT DOCUMENTS

2007/0274227 A1* 11/2007 Rauscher et al. ............ 370/252
2008/0089364 A1* 4/2008 Barry et al. ................. 370/517
2009/0147806 A1* 6/2009 Brueckheimer ............. 370/503

OTHER PUBLICATIONS

Paul Barford & Joel Sommers, "A Comparison of Probe-based and Router-based Methods for Measuring Packet Loss," UW Technical Report, Sep. 2003, 14 pages.

Kostas G. Anagnostakis & Michael Greenwald, "cing: Measuring Network-Internal Delays using only Existing Infrastructure," IEEE INFOCOM 2003, 10 pages.

N.G. Duffield & M Grossglauser, "Trajectory Sampling for Direct Traffic Observation," Networking, IEEE/ACM Transactions on, vol. 9, Issue 3, Jun. 2001 (14 pages).

"Cisco IOS IP Service Level Agreements," Data Sheet, Cisco Systems, Inc., San Jose, CA, Feb. 2006, 5 pages.

U.S. Appl. No. 12/022,998, filed Jan. 30, 2008, Dana Blair.

U.S. Appl. No. 10/797,520, filed Mar. 9, 2004, Daniel Wing.

U.S. Appl. No. 09/823,429, filed Mar. 30, 2001, Iqbal Husain.

Davie et al., "An Expedited Forwarding PHB (Per-Hop Behavior)," RFC 3246, The Internet Society, Mar. 2002.

* cited by examiner

EXAMPLE NETWORK

EXAMPLE NETWORK

EXAMPLE NETWORK

| INSTRUMENTATION FLOW ID 491 | COUNT OF OCCURRENCE OF PACKET SWITCHING LATENCY (JITTER) <= THRESHOLD1 \ 492 | COUNT OF OCCURRENCE OF PACKET SWITCHING LATENCY (JITTER) > THRESHOLD1 AND < THRESHOLD2 \ 493 | COUNT OF OCCURRENCE OF PACKET SWITCHING LATENCY/ (JITTER) >= THRESHOLD2 \ 494 | DROPPED PACKETS / SEQUENCE NUMBER SCRATCHPAD \ 495 | PEAK / AVERAGE DELAY / SCRATCHPAD \ 496 | OTHER VALUES \ 497 |
|---|---|---|---|---|---|---|
| 0 | | | | | | |
| 1 | | | | | | |
| ••• | | | | | | |
| N | | | | | | |

EXAMPLE DATA STRUCTURE FOR A MEASURED POINT IN THE PACKET SWITCHING DEVICE 490

FIGURE 4C

INSTRUMENTING PACKET FLOWS

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Customers who rely on the use of such networks may contract with one or more service providers to provide one or more guaranteed levels of service, which is typically referred to as a Service Level Agreement. It is important for a Service Provider to provide such service, and to provide measurements detailing such provided levels of service.

In the past, typically special measuring devices (e.g., test instrumentation devices) are connected at various points in a network, which send test packets among themselves in order to measure the levels of service provided between these special measuring devices.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
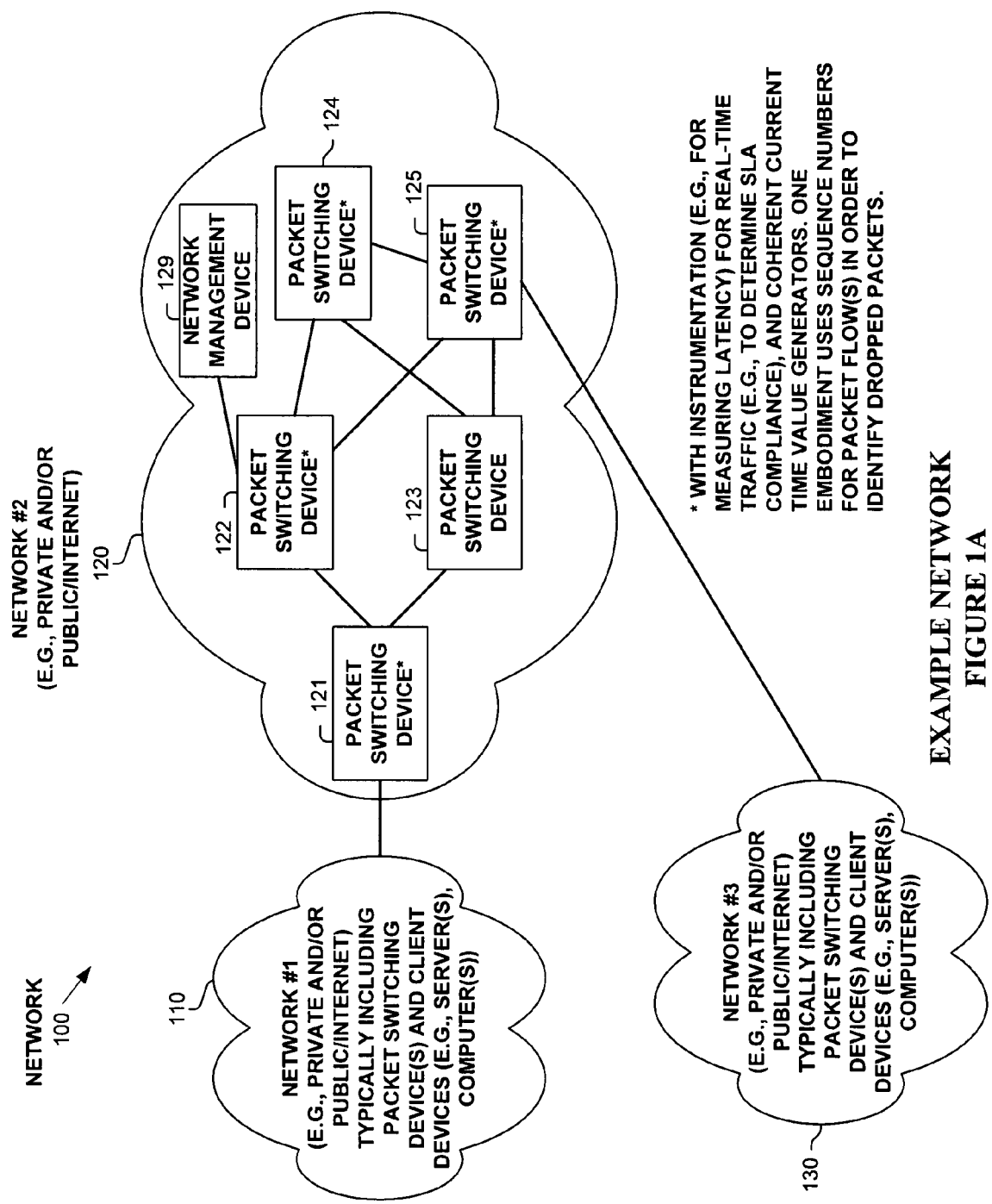
FIG. 1A illustrates an example of networks useful for explaining the operation of one embodiment.

Disclosed are, inter alia, methods, apparatus, computer-readable media, mechanisms, and means for measuring packet latencies in and/or among packet switching devices, such as, but not limited to, routers or a bridge.

One embodiment includes a packet switching device in a network of packet switching devices, with each of these packet switching devices being configured to generate one or more successions of time values coherently with the other packet switching devices. In one embodiment, the packet switching device includes: means for receiving a packet including an embedded time value from another of the packet switching devices in the network; means for identifying at one or more positions within the packet switching device a current time value and tangibly storing in one or more computer-readable media representations based on one or more packet switching network latencies for the packet; and means for forwarding the packet to another packet switching device in the network. In one embodiment, these packet switching network latencies are determined for the packet based on the embedded time value in the packet and one or more of the time values identified for the packet.

2. Description

Disclosed are, inter alia, methods, apparatus, computer-readable media, mechanisms, and means for measuring packet latencies in and/or among packet switching devices, such as, but not limited to, routers or a bridge.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.). The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein, including, but not limited to, describing personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms, and means for measuring packet latencies in and/or among packet switching devices, such as, but not limited to, routers or a bridge.

One embodiment includes a method performed by a packet switching device (e.g., bridge or router) for determining packet delays by the packet switching device. The packet switching device includes: multiple ingress interfaces configured to perform operations including receiving packets from sources external to the packet switching device, multiple egress interfaces configured to perform operations including transmitting packets to destinations external to the packet switching device; and a switching mechanism configured to perform operations including switching packets received on ingress interfaces to the egress interfaces. One embodiment generates one or more successions of time values and provides these time values to components of the packet switching device requiring access to said time values. A current time value is associated with each of a plurality of packets arriving on an ingress interface, wherein this current time value associated a specific packet represents a current time of receiving the specific packet on the ingress interface. For each particular packet of the plurality of packets, the method includes: transporting the particular packet's associated time value in internal packet information additionally transported along with the particular packet; processing the particular packet including routing the particular packet to its destination egress interface and transmitting the particular packet without the internal packet information; and identifying at one or more positions other than the ingress interfaces within the packet switching device, a current time value of the generated time values and tangibly storing in one or more computer-readable media representations based on one or more packet switching device latencies for the particular packet determined based on the time values associated with or identified for the particular packet.

In one embodiment, a larger plurality of packets includes the plurality of packets; and wherein the method includes: classifying each packet of the larger plurality of packets arriving on the ingress interface to identify whether or not the packet is included in the plurality of packets for which said one or more latencies are determined. In one embodiment, said one or positions other than said ingress interfaces within the packet switching device for the particular packet include a position corresponding to the time of transmission of the particular packet from its said destination egress interface to a destination external to the packet switching device. In one embodiment, said one or positions other than said ingress interfaces within the packet switching device for the particular packet include a position corresponding to the time of egress enqueuing of the particular packet. In one embodiment, said representations based on one or more packet switching device latencies include packet counts for each of a plurality of ranges of said latencies.

One embodiment includes a network, which includes multiple packet switching devices communicatively coupled together, wherein each of these packet switching devices is configured to generate one or more successions of time values coherently with the other packet switching devices and to provide one or more of the time values to components within the packet switching device requiring access to these time values. A first of these packet switching devices is configured, for each particular packet of a plurality of packets received from a source external to the network, to: add a current time value of said time values to said particular packet, and forward said particular packet including the current time value to another packet switching device of the plurality of packet switching devices towards a destination external to the network; and wherein said current time value associated with each said particular packet represents a current time of said particular packet at a particular position within the first packet switching device. A second of these packet switching devices is configured to receive each of the plurality of packets forwarded by the first packet switching device and for each said received packet: to identify at one or more positions within the second packet switching device a current time value of said time values and tangibly storing in one or more computer-readable media representations based on one or more packet switching network latencies for said received packet; and to strip the current time value from said received packet and to forward said received packet without the current time value from the network towards the destination external to the network; wherein said one or more packet switching network latencies are determined for said received packet based on said current time value added to said received packet by the first packet switching device and one or more said time values said identified for said received packet.

In one embodiment, a larger plurality of packets includes the plurality of packets; and wherein the first packet switching device is configured to classify each packet of the larger plurality of packets to identify whether or not the packet is included in the plurality of packets for which the current time is said added to the packet.

In one embodiment, the first packet switching device is configured to add a shim header to said particular packet, the shim header including one or more fields for communicating information including the current time value; wherein neither an Internet Protocol nor a Layer-2 packet header of said particular packet includes the shim header; and wherein the second packet switching device is configured to strip the shim header including the current time value from said received packet and to forward said received packet without the shim header from the network towards the destination external to the network. In one embodiment, a larger plurality of packets includes the plurality of packets; and wherein the first packet switching device is configured to classify each packet of the larger plurality of packets to identify whether or not the packet is included in the plurality of packets for which the current time is said added to the packet, and if determined as one of the plurality of packets for which the current time is said added to the packet, to add a classification identification in the shim header generated based on said classification in order to differentiate from other classifications. In one embodiment, the first packet switching device is configured to add a sequence number to the shim header of each of the plurality of packets forwarded by the first packet switching device; and wherein the second packet switching device is configured to update said one or more computer-readable media representations based on a determination of whether or not a packet has been dropped based on the sequence numbers of said packets received by the second packet switching device.

In one embodiment, the current time value added to said particular packet by the first packet switching device represents a current time of receiving said particular packet by the first packet switching device. In one embodiment, said one or more positions with the second packet switching device include a position corresponding to the time of transmission of said received packet from the second packet switching device. In one embodiment, said one or more positions with the second packet switching device include a position corresponding to the time of enqueuing of said received packet to an egress packet processing engine prior to the time of transmission of said received packet from the second packet switching device.

In one embodiment, the particular packet is created by the first packet switching device and not received from another device and the plurality of packets includes said created particular packet.

In one embodiment, said representations based on one or more packet switching network latencies include packet counts for each of a plurality of ranges of said packet switching network latencies. In one embodiment, the plurality of range of values are determined based on a customer service level agreement (SLA) for determining compliance with the SLA.

In one embodiment, the plurality of packet switching devices includes a third packet switching device; wherein the third packet switching device is configured to receive each of the plurality of packets forwarded by the first packet switching device and for each said received packet: to identify at one or more positions within the third packet switching device a current time value of said time values and tangibly storing in one or more computer-readable media representations in the third packet switching device based on one or more packet switching network latencies for said received packet; and to forward said received packet from the network towards the destination external to the network through the second packet switching device; wherein said one or more packet switching network latencies are determined for said received packet based on said current time value added to said received packet by the first packet switching device and one or more said time values said identified for said received packet. In one embodiment, said one or more positions within the third packet switching device include a position corresponding to the time of receiving of said received packet by the third packet switching device. In one embodiment, said one or more positions within the third packet switching device include a position corresponding to the time of transmission of said received packet from the third packet switching device. In one embodiment, the third packet switching device is configured to add an additional one or more of the current time values said identified by the third packet switching device for a packet to the packet.

In one embodiment, each of the plurality of packet switching devices configured to store packet switching network latencies are configured to communicate said stored packet switching network latencies to one or more network management devices.

One embodiment includes a packet switching device of a network of a communicatively-coupled plurality of packet switching devices with each of the plurality of packet switching devices being configured to generate one or more successions of time values coherently with said other packet switching devices, wherein the network of packet switching devices is communicatively coupled to one or more external networks, the packet switching device comprising: means for receiving a first packet from one of said external networks; means for embedding a current time value of said time values in the first packet; and means for forwarding the first packet including said embedded current time value to another of said packet switching devices; and means for receiving a second packet including an embedded time value received from another of said packet switching devices in the network; means for identifying at one or more positions within the packet switching device a current time value of said time values and tangibly storing in one or more computer-readable media representations based on one or more packet switching network latencies for the second packet; means for stripping the embedded time value from the second packet; and means for forwarding the second packet without the embedded time value to another device in said one or more external networks; wherein said one or more packet switching network latencies are determined for the second packet based on its said embedded time value and one or more said current time values said identified for the second packet.

In one embodiment, said means for embedding the current time value in the first packet includes means for adding a shim header to the first packet with the shim header including the current time value; and wherein said means for stripping the embedded time value from second packet includes means for stripping the shim header including the embedded current time value from the second packet. In one embodiment, a classification identifier (e.g., flow id) is added to the shim header (or elsewhere in the packet) to different flows of packet traffic. In one embodiment, a sequence number for each flow of traffic is added to the shim header (or elsewhere in the packet) to be able to readily identify whether or not packets were dropped.

One embodiment includes a packet switching device of a network of a communicatively-coupled plurality of packet switching devices with each of the plurality of packet switching devices being configured to generate one or more successions of time values coherently with said other packet switching devices, the packet switching device comprising: means for receiving a packet including an embedded time value from another of said packet switching devices in the network; means for identifying at one or more positions within the packet switching device a current time value of said time values and tangibly storing in one or more computer-readable media representations based on one or more packet switching network latencies for the packet; and means for forwarding the packet to another packet switching device in the network; wherein said one or more packet switching network latencies are determined for the packet based on said embedded time value in the packet and one or more said time values said identified for the packet.

In one embodiment, the packet switching device is configured to replace said embedded time value with a different time value. In one embodiment, the packet switching device is configured to add additional time values to a packet. In one embodiment, the representations based on one or more packet switching network latencies include packet counts within a plurality of ranges of said latencies.

One embodiment includes a packet switching device, which includes: a plurality of interfaces configured for sending and receiving packets; a switching mechanism configured to switch packets among the plurality of interfaces; and a time value generator configured to generate one or more successions of time values. The packet switching device is configured to: receive a first packet on one of the plurality of interfaces; to embed a current time value of said time values in the first packet; and to forward the first packet including said embedded current time value out a different one of the plurality of interfaces. The packet switching device is configured: to receive a second packet including an embedded time value on one of the plurality of interfaces; to identify at one or more positions within the packet switching device a current time value of said time values corresponding to a position with the packet switching device of the second packet; to determine one or more packet switching network latencies for the second packet based on its said embedded time value and one or more said current time values said identified for the second packet; to store in one or more computer-readable media representations based on said one or more packet switching network latencies for the second packet; and to forward the second packet without the embedded time value from a different one of the plurality of interfaces. In one embodiment, the packet switching device is configured to said embed the current time value in the first packet by adding a shim header to the first packet with the shim header including the current time value; and wherein the packet switching device is configured to strip the shim header including the embedded current time value from the second packet before forwarding the second packet from said different one of the plurality of interfaces.

One embodiment includes a packet switching device of a network of a communicatively-coupled plurality of packet switching devices, wherein the network of packet switching devices is communicatively coupled to one or more external networks. The packet switching device is configured to perform operations, including: generating one or more successions of time values coherently with said other packet switching devices of the plurality of packet switching devices; receiving a first packet from one of said external networks; embedding a current time value of said time values in the first packet; and forwarding the first packet including said embedded current time value to another of said packet switching devices; and receiving a second packet including an embedded time value received from another of said packet switching devices in the network; identifying at one or more positions within the packet switching device a current time value of said time values corresponding to a position with the packet switching device of the second packet; determining one or more packet switching network latencies for the second packet based on its said embedded time value and one or more said current time values said identified for the second packet; storing in one or more computer-readable media representations based on said one or more packet switching network latencies for the second packet; and forwarding the second packet without the embedded time value to another device in said one or more external networks. In one embodiment, said embedded current time value in the first packet represents a current time of receiving the first packet by the packet switching device.

One embodiment includes a packet switching device including: a plurality of interfaces configured for sending and receiving packets; a switching mechanism configured to switch packets among the plurality of interfaces; and a time value generator configured to generate one or more successions of time values. The packet switching device is configured: to receive a particular packet including an embedded time value on a first interface of the plurality of interfaces; to identify at one or more positions within the packet switching device a current time value of said time values for the particular packet corresponding to a position with the packet switching device of the particular packet; to determine one or more packet switching network latencies based on said embedded time value in the particular packet and one or more said time values said identified for the particular packet; to store in one or more computer-readable media representations based on said one or more packet switching network latencies; and to forward the particular packet from a second interface of the plurality of interfaces.

In one embodiment, the packet includes a sequence number; and wherein the packet switching device is configured to update said one or more computer-readable media representations based on a determination of whether or not a packet has been dropped based on the sequence number. In one embodiment, said position with the packet switching device corresponds to the time of transmission of the particular received packet from the second interface. In one embodiment, said position with the packet switching device corresponds to the time of enqueuing the particular packet to an egress packet processing engine prior to the time of transmission of the particular received packet from the second interface.

Turning expressly to the figures, FIG. 1A illustrates a network 100, which includes three communicatively-coupled networks 110, 120, and 130. In this example network 100, networks 110 and 130 correspond to customer-private and/or access networks, and network 120 is a network communicatively-coupling networks 110 and 130 (e.g., at least some packets sent between networks 110 and 130 flow through network 120). Network 120 is shown to include multiple packet switching devices 121-125 (e.g., routers, bridges) and a network management device 129 (e.g., computer) for use in one embodiment to configure the latency time measurement functions of packet switching devices 121-125 and for collecting determined and stored packet latency information from packet switching devices 121-122 and 124-125, using coherent current time value generators. Additionally, in one embodiment, the instrumentation of packets (in addition to, or without latency measurements) could include, for example, the use of sequence numbers added to packets by a packet switching device 121-122 and 124-125 with these sequence numbers being stripped off before exiting network 120. This use of sequence numbers would allow a packet switching device 121-122 and 124-125 to identify whether or not a packet in a stream of packets was dropped within network 120. Note, packet switching device 123 is not denoted as including packet instrumentation merely to illustrate it is possible for network 120 to perform useful instrumentation measurements without all packet switching devices in the network configured to perform such instrumentation measurements.

These coherent current time value generators are synchronized in order to enable the determination of an absolute time value difference between current time values generated on two different packet switching devices 121-122 and 124-125. For example, these current time value generators may be synchronized clocks, including, but not limited to time of day clocks acquiring their value from Network Time Protocol (NTP), a Time server, DAYTIME protocol, Global Positioning Satellites (GPS), IEEE 1588, DOCSIS Timing Interface (DTI), Universal Timing Interface (UTI), or any other publicly available or proprietary time synchronization technique. These current time value generators should be synchronized in a manner to provide the appropriate resolution required for the latency measurements (e.g., if these measurements are determined at the microsecond level, the clocks must be synchronized accordingly such that their difference will be inconsequential—and synchronization of clocks within a value of the order of a second will typically not produce useful measurements in this example). In one embodiment, packet switching devices 121-122 and 124-125 exchange information, and possibly negotiate, the method of time synchronization, granularity, precision, and/or other parameters to use for the instrumentation of packets.

In one embodiment, the latency of packets traveling between network 110 and network 130 can be measured.

Typically, this measuring is selective, such as for a particular one or more packet flows, where a packet flow is defined as a common characteristic of each packet of the stream of packets in the flow. Examples of flows include, but are not limited to: (a) a common five tuple of source address, source port, destination address, destination port, and protocol type (which each being a specific value, one or more values such as a set or range of values); (b) a traffic type (e.g., video); (c) a traffic type from a source to a destination; (c) or any other flow identified by the common operation called "packet classification" which performs a lookup on one or more values/fields of a packet to determine one or more particular flows, if so defined. In one embodiment, a packet can belong to multiple flows for which packet latency measurements are being performed. In one embodiment, packet latency measurements are simultaneously made on multiple different packet flows. Additionally, it is possible for packets in different streams of packets to traverse different paths due to load balancing within a packet switch or within a network, for example; and therefore, one embodiment includes a selectable feature of recording the path taken by a packet in the packet encapsulation (e.g., for within a packet switching device) and information added to a packet (e.g., in a shim header for within a packet switching network such as network 100).

In example network 100, packets traveling from network 110 through packet switching devices 121, 123 and 125 can be created by packet switching devices 121 and 125 (as opposed to being received from a device external to network 100). Additionally, a multiple instances of a packet may be created as a result of multicast services, snooping services, etc., with each packet containing a time value and/or other values for performing the desired instrumentation of the real, customer traffic (as opposed to instrumentation packets generated by test instrumentation which do not contain real traffic, and thus, this approach does not instrument real, customer traffic).

In one configuration, a current time value is associated with a packet corresponding to its time of arrival at packet switching device 121, with a latency measurement made by packet switching device 125 corresponding to the time the packet is sent from packet switching device 125 and/or the time the packet is enqueued to be sent from packet switching device 125. If the packet flowed through other packet switching devices with latency instrumentation (e.g., packet switching device 122), then additional latency measurements could be made at and/or within these intermediate devices. Various examples of common places of interest for making such latency measurements within a packet switching device (e.g., within packet switching devices 121, 122, and/or 125 for this example) are further discussed in relation to FIG. 2B.

Of course, this same instrumentation of the network can be performed by nested networks, i.e., networks within networks, with each of the nested networks being able to perform instrumentation of the packets independently of the other network(s). This concept is similar to recursion in Computer Science, and may be especially useful when different entities manage different portions of a network (e.g., autonomous systems). In one embodiment, each autonomous system or other entity uses a different shim header. In one embodiment, these shim headers are stacked.

Figure 1B:
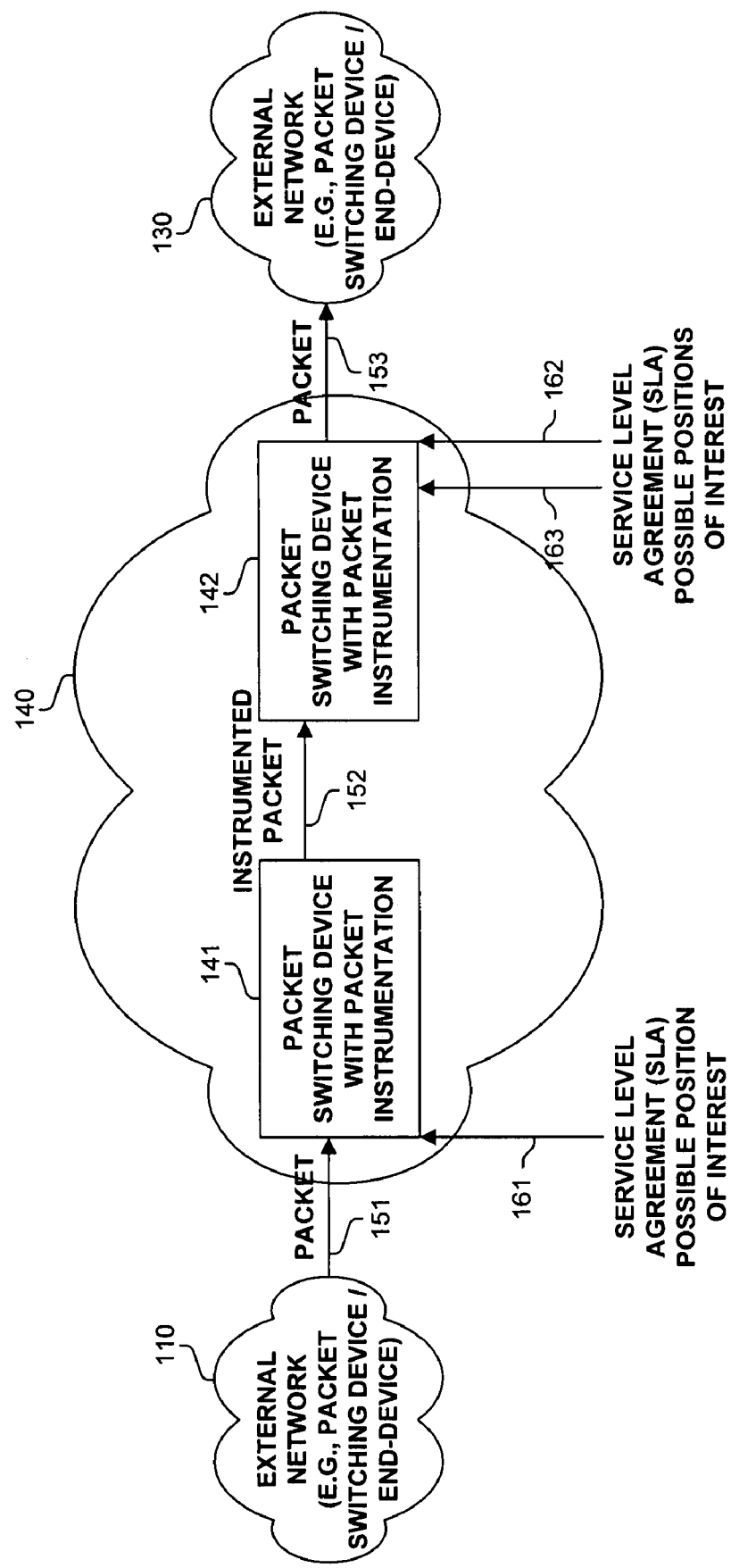
FIG. 1B illustrates an example of networks useful for explaining the operation of one embodiment.

FIG. 1B illustrates the operation of one embodiment. A packet is received (151) by packet switching device 141 (with latency instrumentation) of network 140 from network 110 (e.g., from a packet switching device, computer, server, etc. from within network 110). A current time value corresponding to the time of receipt of the packet (position 161) is added to the packet for carrying with it through network 140. This instrumented packet (e.g., the received packet containing the current time value at some position within network 140) is forwarded through network 140 and arrives at packet switching device 142 (with latency instrumentation). One or more packet switching network latencies are determined based on the time value carried in the packet and a current time value generated within packet switching device 142 at one or more positions. In one embodiment, this current time value corresponds to (position 162) the time that the packet, with the latency instrumentation information stripped from it, is sent from (153) packet switching device 142 to external network 130. In one embodiment, this current time value corresponds to the time (position 163) that the packet is enqueued to be sent from packet switching device 142. In one embodiment, the packet switching network latency is used to determine compliance with a customer service agreement (SLA), and when doing so, the position(s) of interest for identifying current time values typically will correspond to those defined by the SLA, such as, but not limited to positions 161, 162, and 163 as shown in FIG. 1B.

In one embodiment, a classification identification to also added by packet switching device 141 to the packet to identify to which classification the packet is associated, and therefore, a downstream packet switching device does not need to perform a classification operation to identify the classification. In one embodiment, a sequence number, possibly for the classification, is also added by packet switching device 141 such that a downstream router can readily identify a dropped packet. In keeping with the scope and spirit of the invention, in one embodiment, other instrumentation is also added by packet switching device 141 to the packet. In one embodiment, such instrumentation packets includes determination of packet latency, jitter in terms of packet latency, inter-packet jitter, flow durations, dropped packets, and/or other measurements.

Figure 1C:
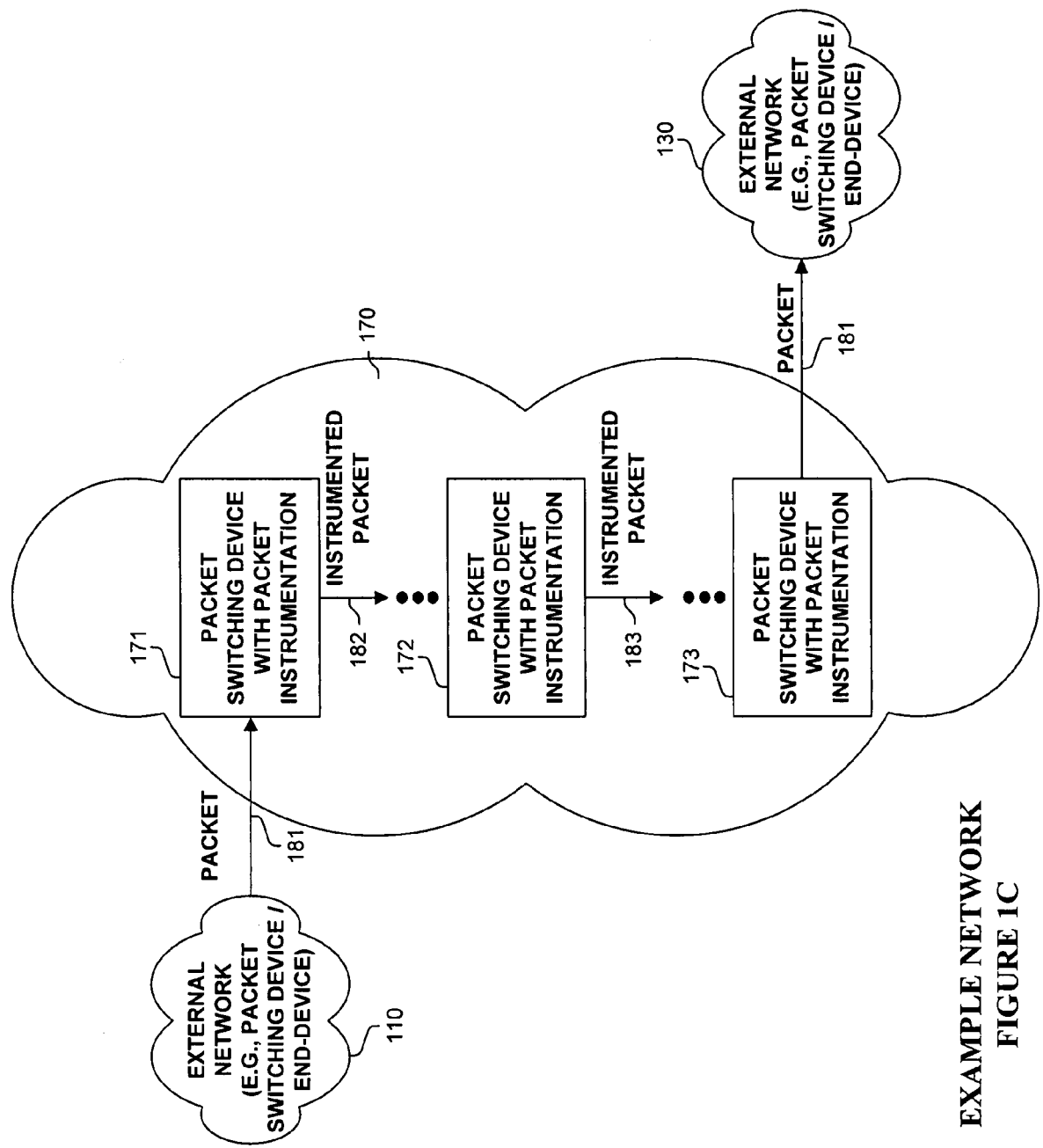
FIG. 1C illustrates an example of networks useful for explaining the operation of one embodiment.

FIG. 1C illustrates the operation of one embodiment. A packet is received (181) by packet switching device 171 (with latency instrumentation) of network 170 from network 110 (e.g., from a packet switching device, computer, server, etc. from within network 110). A current time value corresponding to the time of receipt of the packet is added to the packet for carrying with it through network 170. This instrumented packet (e.g., the received packet containing the current time value at some position within network 170) is forwarded through network 170 and arrives at packet switching device 172 (with latency instrumentation). One or more packet switching network latencies are determined based on the time value carried in the packet and a current time value generated within packet switching device 172 at one or more positions. This instrumented packet is forwarded (183) through network 170 and arrives at packet switching device 173 (with latency instrumentation). One or more packet switching network latencies are determined based on the time value carried in the packet and a current time value generated within packet switching device 173 at one or more positions. After having the latency instrumentation stripped from the packet by packet switching device 173, the packet is forwarded (183) to its destination network 130.

In addition to determining latency, one embodiment measures other values using the current time values of one or more packet switching devices. One embodiment adds sequence numbers to packets, whether in internal packet encapsulations within a packet switching device or within packets themselves (e.g., in shim headers), to be able to identify whether or not packets have been dropped from the corresponding packet flow(s).

Figure 2A:
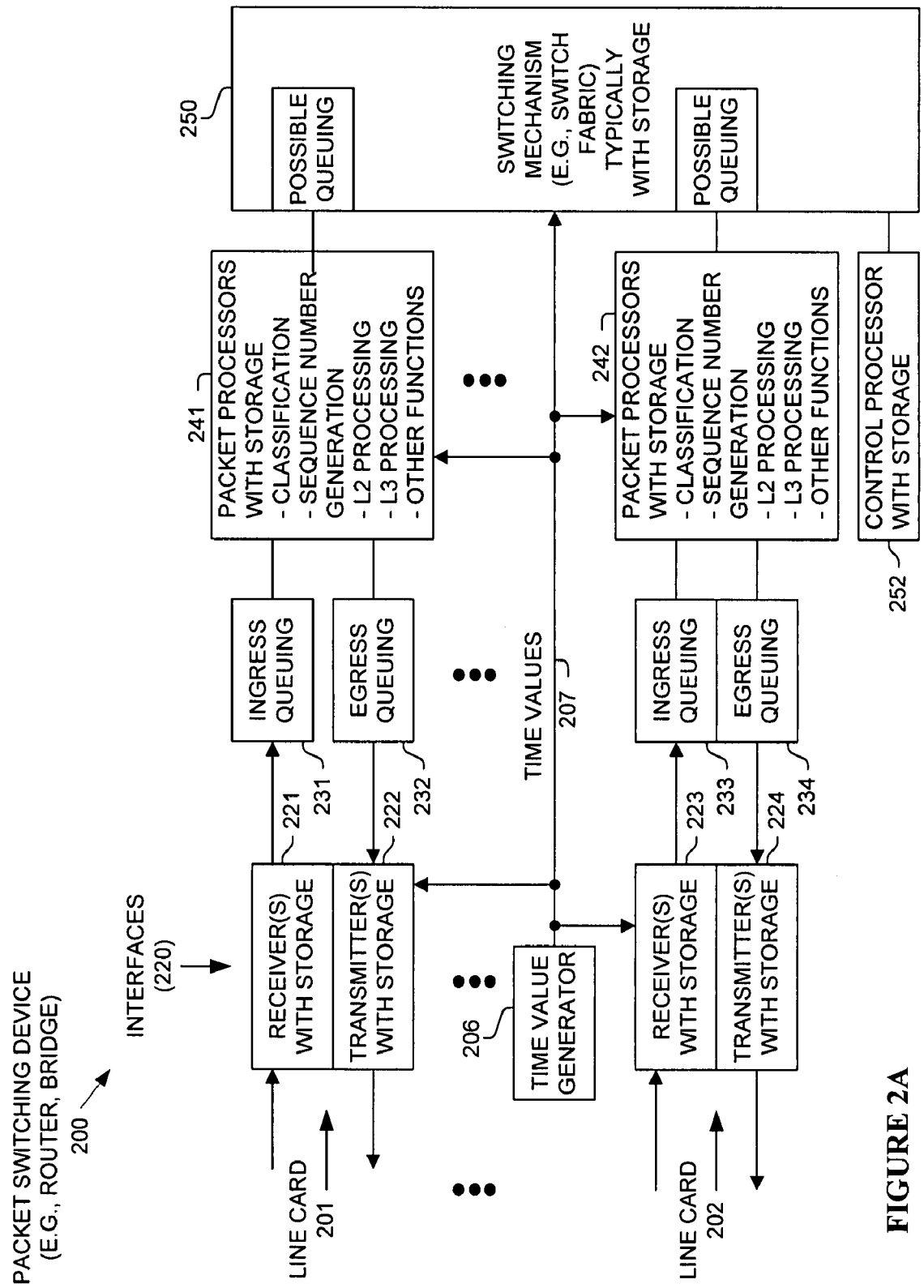
FIG. 2A illustrates an example of a packet switching device useful for explaining the operation of one embodiment.

FIG. 2A illustrates an example of a packet switching device useful for explaining the operation of one embodiment. As shown, packet switching device 200 (e.g., router, bridge, etc.) comprises: line cards 201-202 which include ingress and egress interfaces (220), queuing (231-234), and packet processors with storage (241-242); switching mechanism 250 (e.g., switch fabric, bus, crossbar) which may include input or output queues (or possibly these queues are located elsewhere, such as on a line cards 201-202); control processor with storage 252 and current time value generator 206, which is configured to generate and distribute time values (207) to components within packet switching device 200 which will make latency measurements. In one embodiment, control processor with storage 252 performs the synchronization of time with other packet switches in order for the packet switches to coherently generate time values such that packet latencies can be determined (e.g., based on a difference in current time values generated by different packet switching devices).

In one embodiment, packets are received on ingress interfaces (220, receivers with storage 221, 223) and are typically associated with some internal packet switching information for use in processing (e.g., including forwarding) of the packet. In one embodiment, a time value (207) reflecting the time that a packet was received is recorded and/or associated with the packet. In one embodiment, a classification operation is performed on a packet to identify whether or not to instrument it. In one embodiment, the packet is inspected to determine whether it includes latency instrumentation, such as in an instrumentation shim header, and possibly an identification of a packet flow for instrumentation purposes associated with the packet.

In one embodiment, packet latency measurements are made within packet switching device 200, without regard to whether or not packet switching network latency (e.g., across multiple packet switching devices) is being measured. In this situation and either all packets are being instrumented or it was classified to determine that the packet should be instrumented, the ingress time value is typically placed in the internal packet information associated with a received packet; otherwise the time value is discarded. In one embodiment, a sequence number corresponding to the classification is added to the internal packet information for easy detection of packets being dropped in packet switching device 200. By carrying this time of receipt of the packet in the internal packet information, intra-packet switch 200 latency measurements can be made at different positions in packet switching device 200. In one embodiment, multiple time values, typically corresponding to multiple locations within packet switching device 200, can be stored in the internal packet information. In one embodiment, the time value in the internal packet information can be replaced at different positions within packet switching device 200, so that latency measurements can be made from a different starting point. In one embodiment, these latency measurements are tangibly stored in a one or more computer-readable media within packet switching device 200, and collected or sent to a network management workstation for further analysis, possibly for determining SLA compliance.

Figure 2B:
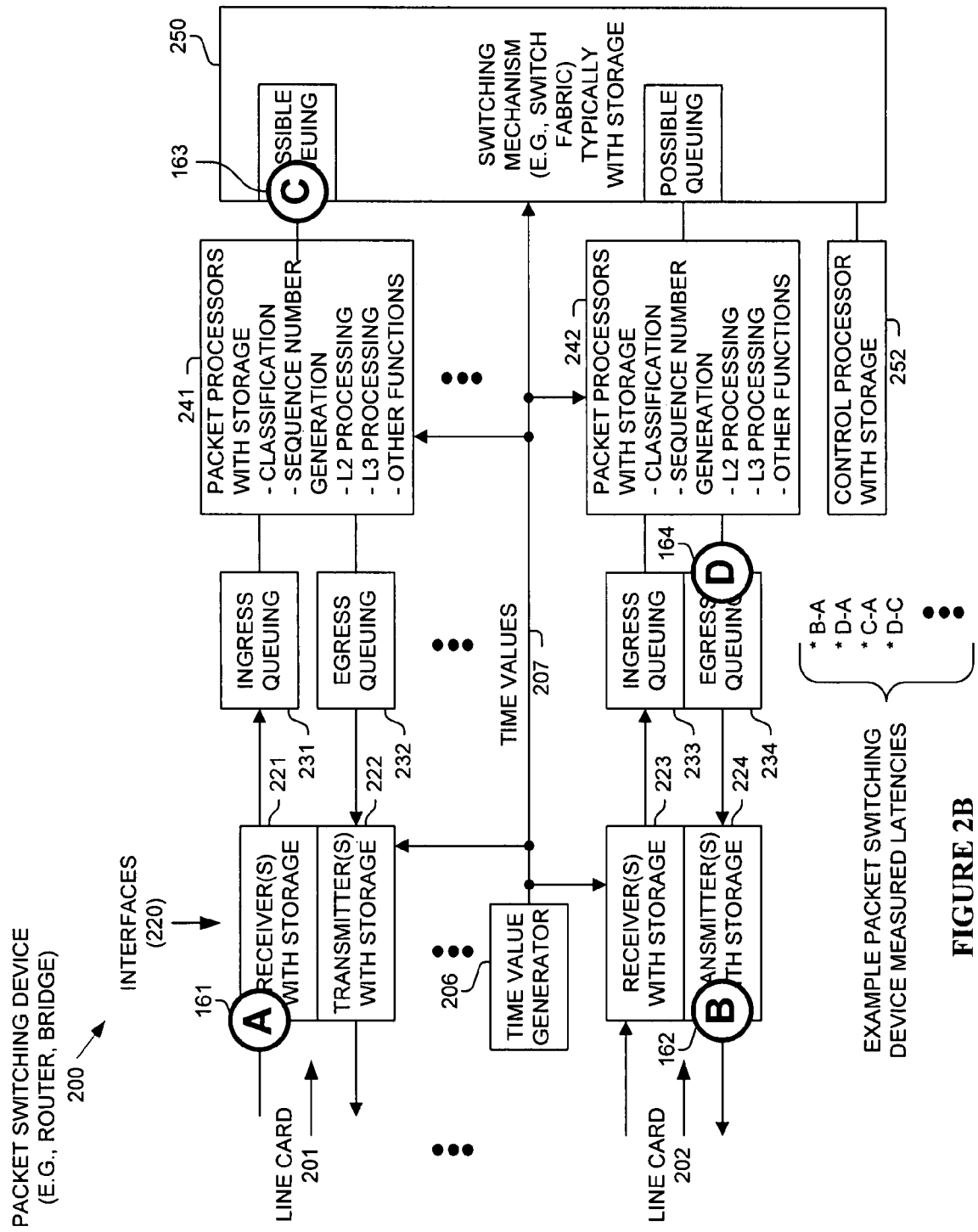
FIG. 2B illustrates several examples of an extensible number of points within a packet switching device where noting time values for determining delays may be of particular interest.

For example, the ingress time value is stored in the internal packet information of a received packet. Packets with internal packet information proceed through ingress queuing (231, 233) to packet processors with storage (241, 242), which typically are capable of performing many functions, including, but not limited to packet classification, sequence number generation, Layer-2 processing, Layer-3 processing and other functions. The packet with internal packet information is forwarded through packet switching device 200 to its destination egress interface 220 (e.g., transmitters with storage 222, 224), with one or more additional time values 207 recorded or used for determining a delay at one or more positions within packet switching device 200. For example, turning to FIG. 2B, illustrated is packet switching device 200 annotated with four positions (A 261, B 262, C 263, D 264) that may be of particular interest using a time value generator 206 for determining a delay internal to packet switching device 200.

First, position A 261 corresponds to the time of receiving of a packet. Second, position B 262 corresponds to the time that the packet is sent out of packet switching device 200. Third, position C 263 corresponds to input queuing of switching mechanism 250. Fourth, position D 264 corresponds to egress queuing 234 of egress packet processor 242 (e.g., L3 egress packet processor). Finally, one or more other positions within packet switching device 200 can be metered (possibly with not metering one or more of positions A-D 261-264). The individual components of packet switching device 200 typically either determine the delays or store appropriate time values and communicate them to a centralized device such as control processor with storage 252, which can provide these measured values to one or more external systems, network management systems, testing systems, or to a user via a display and/or command line language or other user interface, etc.

Additionally, inter-packet switching latencies are determined in one embodiment, such as those based on time values generated by two different packet switching devices.

In one embodiment, a packet is received on an ingress interface (220, receivers with storage 221, 223) and is associated with a time value (207) reflecting the time that a packet was received. In one embodiment, a classification operation is performed on a packet to identify whether or not to instrument it. If so, the time value's association with the packet is maintained, and included in the packet (e.g., in an instrumentation shim header) when sent to another device. In one embodiment, a classification identification reflected of the classification operation is included in the packet such that another classification operation does not need to be performed again on the packet to identify the classification. In one embodiment, a sequence number for the corresponding packet flow is added to the packet (along with the current time value) for use in determining whether or not a packet is dropped in the flow. In addition to inter-packet switching network latencies, intra-packet switching device 200 latencies can be determined for a packet. In one configuration, this initial association of a time value with a packet is performed when received from a different network (e.g., a differently managed network).

In one embodiment, a packet is received on an ingress interface (220, receivers with storage 221, 223) and is associated with a time value (207) reflecting the time that a packet was received. In one embodiment, the packet is classified or inspected for inter-packet switching device instrumentation to determined. If so, one or more latency measurements may be made within packet switching device 200 for the instrumented packet before forwarding it from packet switching device 200.

In one embodiment, (although not required) before forwarding a packet including inter-packet switching device instrumentation, this inter-packet switching device instrumentation is stripped from the packet.

Figure 3:
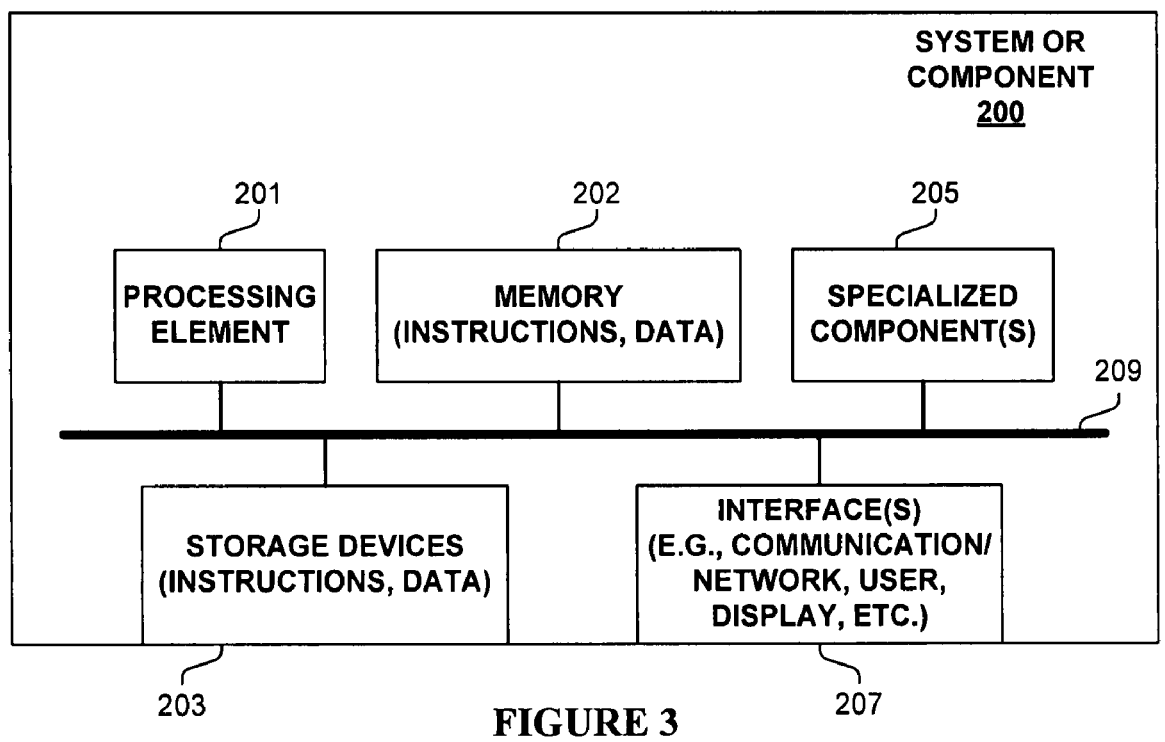
FIG. 3 illustrates an example system or component used in one embodiment.

FIG. 3 is block diagram of a system or component 300 used in one embodiment that measures delays within a packet switching device. In one embodiment, system or component 300 performs one or more processes corresponding to one of the flow diagrams illustrated or otherwise described herein.

In one embodiment, system or component 300 includes a processing element 301, memory 302, storage devices 303, specialized components 305 (e.g. optimized hardware such as for performing classification operations, etc.), and interfaces 307 for communicating information (e.g., sending and receiving packets, user-interfaces, displaying information, etc.), which are typically communicatively coupled via one or more communications mechanisms 309, with the communications paths typically tailored to meet the needs of the application.

Various embodiments of component 300 may include more or less elements. The operation of component 300 is typically controlled by processing element 301 using memory 302 and storage devices 303 to perform one or more tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

Figure 4A:
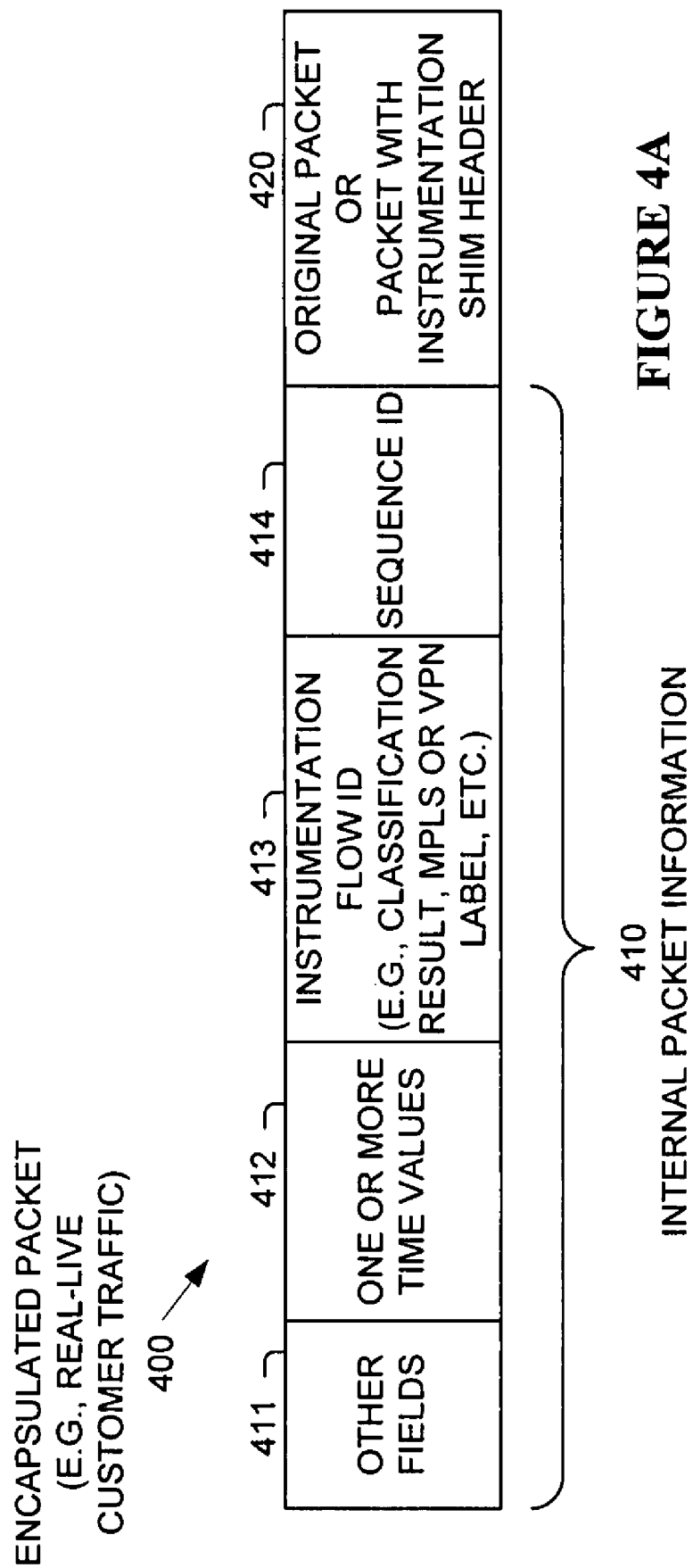
FIG. 4A illustrates an example encapsulation of a packet used in one embodiment.

FIG. 4A illustrates an example encapsulation of a packet 400 used in one embodiment. As shown, original packet 420 (e.g., of real-live customer traffic, not test instrument generated) is encapsulated with internal packet information 410. In one embodiment, internal packet information 410 includes: other fields 411, one or more time values 412 (e.g., ingress time value and/or time values recorded at other positions), an instrumentation flow identifier 413 (e.g., a classification result/index/identifier, MPLS or VPN label, etc.), and a sequence number 414 (for identifying whether or not a metered/instrumented packet is dropped). In one embodiment, other fields 411 includes path information for identifying a path taken by the packet, which may be especially useful when a network performs load balancing. Of course, there are an extensible number of other ways to associate internal packet information 410 with original packet 420, and not all embodiments use all of field 411-420.

Figure 4B:
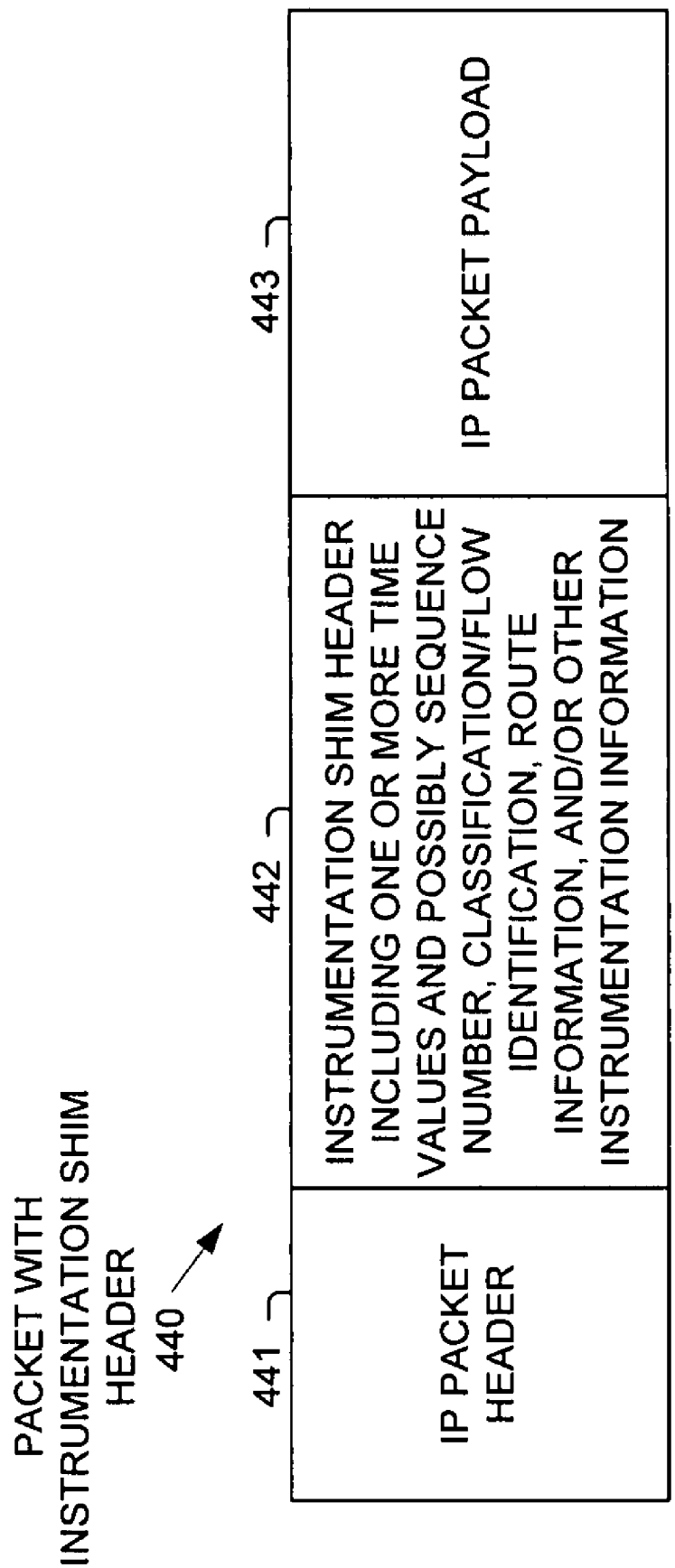
FIG. 4B illustrates an example of a data structure used in one embodiment.

FIG. 4B illustrates an example of a packet with instrumentation shim header 420. As shown, packet 420 includes the original IP packet header (421), the instrumentation shim header including one or more time values, and possibly optional values such as, but not limited to a sequence number, classification/flow identification, route information, and/or other instrumentation information (422), and the original IP packet payload (423).

FIG. 4C illustrates an example of a data structure 490 used in one embodiment for maintaining latency information and/or dropped packet information. This data structure can be located in one or more places where time values are associated with packets and/or a centralized location such as a control processor. As shown, data structure 490 is indexed by instrumentation flow identifier 491 (e.g., classification identifier/index, MPLS or VPN label, etc.). As shown, data structure 490 includes the fields 492-497 for maintaining latency information and/or dropped packet information. Of course, all, some, none and/or other fields are used in one embodiment. As shown, fields 492-494 provide storage for a count of measurements that are below a first threshold (492), a delay between first and second thresholds (493) and above a second threshold (494), which provides a mechanism to measure jitter in the latencies of packets. Field 495 provides storage for information concerning dropped packets, such as a count of the number of dropped packets. In one embodiment, field 495 also includes scratchpad information for determining whether or not a packet was dropped (e.g., an identification of an expected next particular sequence number or window of sequence numbers). Field 496 provides storage for a peak and an average measured delay. In one embodiment, field 496 provides scratchpad storage for determining the average delay. Field 497 provide storage for additional instrumentation values, such as, but not limited to time values for calculating flow durations and inter-packet jitter, and for collecting additionally statistics thereon, such as, but not limited to minimum, maximum, summation, last determined value, etc. The particular measurements kept, their reset rate and/or duration, and what classifications of packets are monitored will typically depend upon the particular one embodiment. In one embodiment, these threshold values are determined in order to identify compliance with a Service Level Agreement.

In one embodiment, the latency and/or jitter measurements are measured between the enqueuing and dequeuing operations for packets for one or more queues (such as, but not limited to those illustrated in FIGS. 2A and 2B), with values and/or statistics maintained such as in fields of data structure 490. Therefore, the distribution of packet latencies and/or jitter through these one or more queues can be measured for real customer traffic.

In one embodiment, a network management device and/or control planes of multiple packet switching devices are configured to instruct which packet switching devices and positions therein to associate current time values and/or make latency measurements. In addition, this instruction/negotiation might include defining configuration parameters such as resolution/precision/accuracy of time values used, which may be especially useful when different packet switching devices determine their correct time of day via different protocols or manners. Additionally, these configuration parameters may include how and/or where to collect send measured latency information and/or dropped packet information.

In one embodiment, latency measurements are made on real-live customer traffic, e.g., in contrast to probe test packets. In one embodiment, latency measurements are made on unicast packets. In one embodiment, latency measurements are made on multicast and/or cloned packets.

Figure 5:
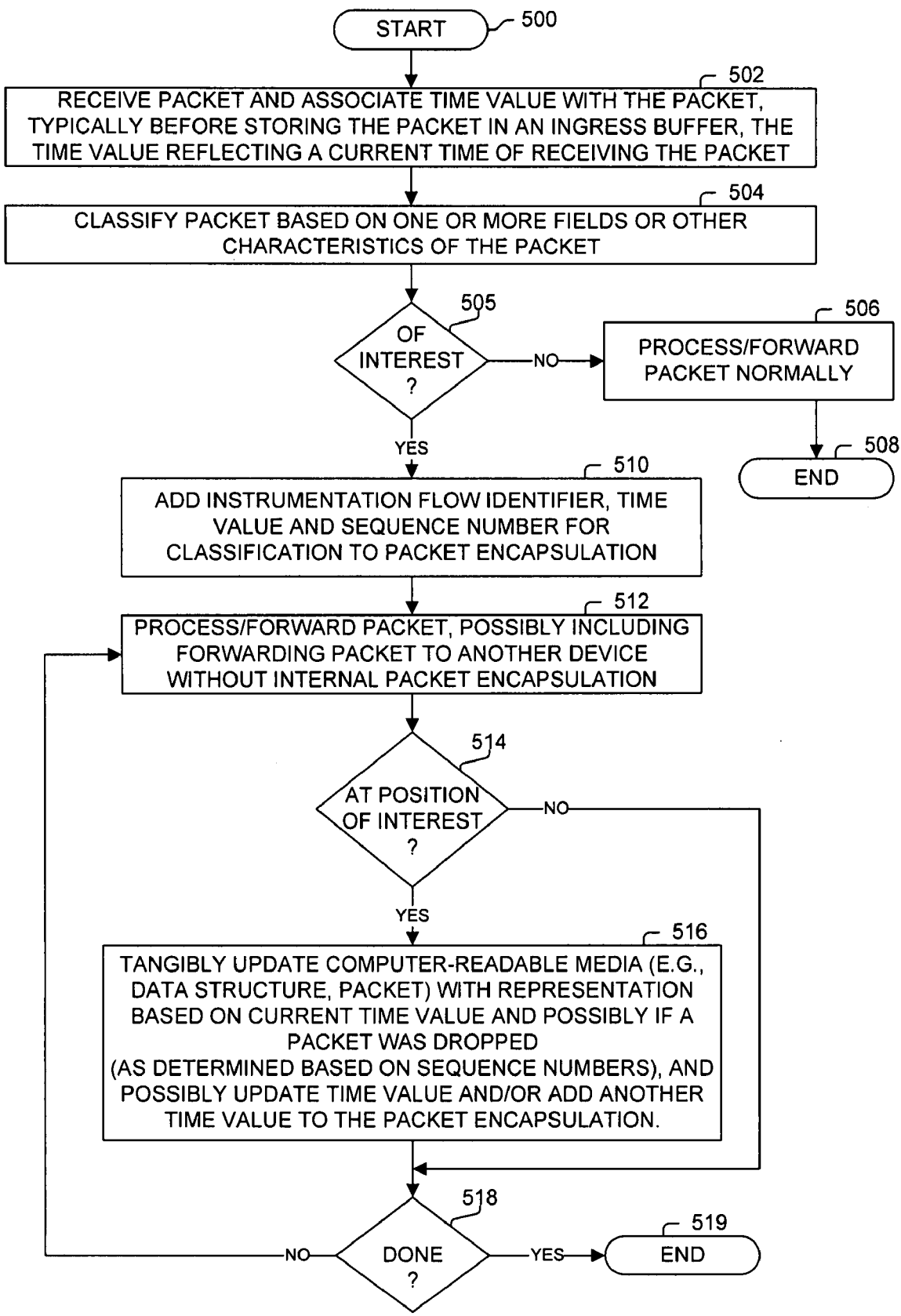
FIG. 5 illustrates a process of determining delays used in one embodiment.

FIG. 5 illustrates a process of determining delays using one or more current time values included in internal packet encapsulation information, which is used in one embodiment. Processing begins with process block 500, and proceeds to process block 502, wherein a packet is received and a time value is associated with the packet, typically prior to storing the packet in an ingress buffer/queue. This ingress time value reflects the current time that the packet was received. Next, in process block 504, the packet is classified based on information extracted from the packet and/or other information or characteristics of the packet, typically to identify whether or not to instrument/measure one or more delays thereon, whether or not to add a sequence number to the packet, and possibly to identify an instrumentation flow identifier for the packet. Note, one embodiment uses an identifier included in the original packet as its instrumentation flow identifier (e.g., an MPLS or VPN label). As determined in process block 505, if the packet is not identified to be of interest for instrumenting/measuring one or more delays thereon, then in process block 506, the packet is processed/forwarded normally, and the processing illustrated in FIG. 5 is complete as indicated by process block 508.

Otherwise, in process block 510, the instrumentation flow identifier, the ingress time value, and possibly a sequence number are added to the internal packet information encapsuling the received packet, and the packet is processed/forwarded as indicated by process block 512. Such processing may include forwarding the packet to another device without the internal packet encapsulation. In one embodiment, such processing includes adding a shim header to a packet and forwarding to another device, with the shim header including a time value and/or one or more other values extracted from the internal packet information, and/or a time value corresponding to the sending, or enqueuing for sending, of the packet to another device.

As determined in process block 515, if the packet is at a position of interest for instrumentation/delay measurement purposes (e.g., such as, but not limited to those positions discussed in relation to FIGS. 2A-B), then in process block 516, one or more computer-readable media (e.g., a data structure, the internal packet information, etc.) are updated with a representation (e.g., a determined delay, the new current time value or an indication thereof, etc.) based on the current time value (reflective of a current time) and possibly if a packet was determined to be dropped based on the sequence number of the packet. As determined in process block 518, if there is more processing (which includes forwarding) of the packet required (e.g., it has not been sent from the packet switching device), then processing returns to process block 512; otherwise, processing is complete as indicated by process block 519.

Figure 6:
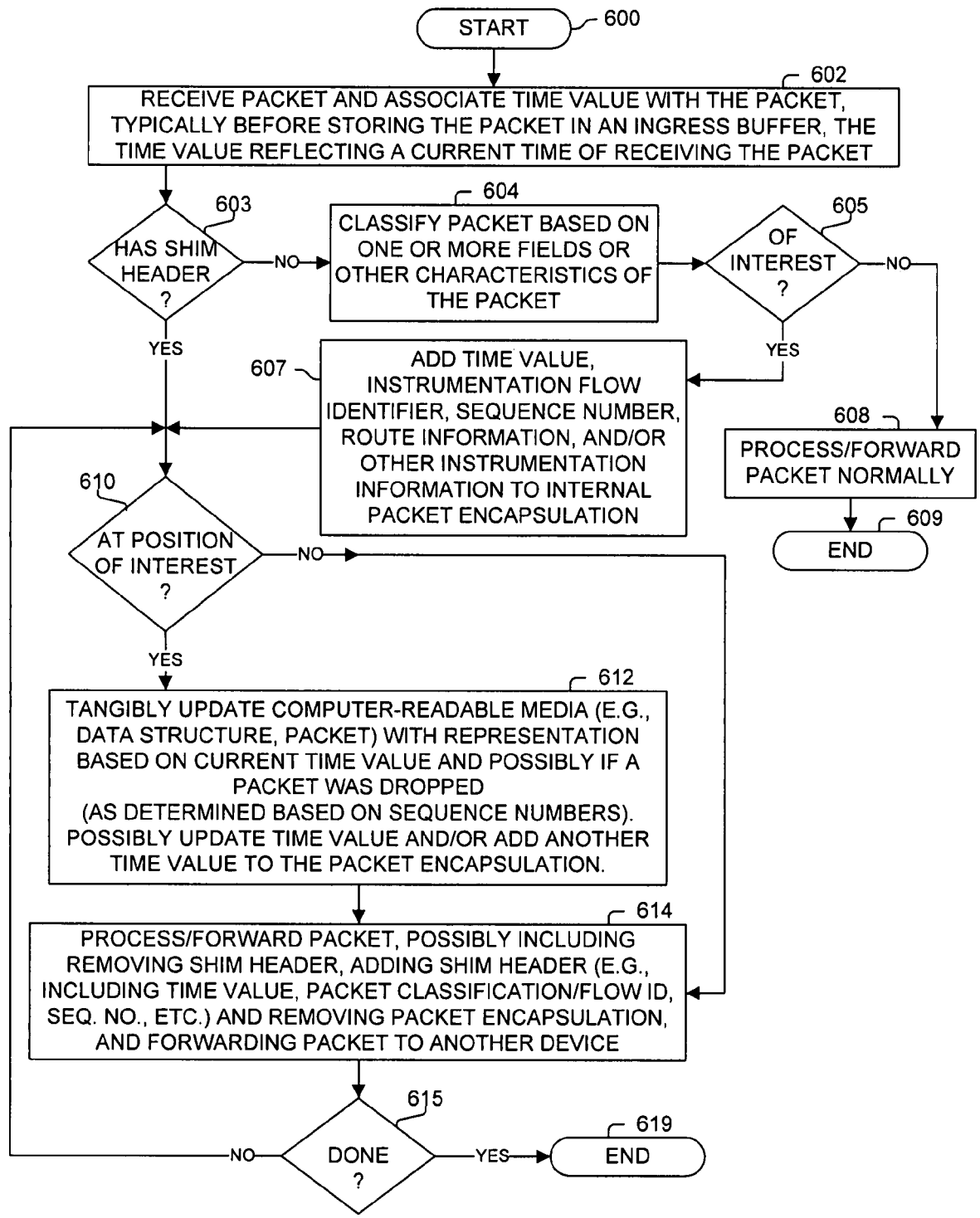
FIG. 6 illustrates a process of determining delays used in one embodiment.

FIG. 6 illustrates a process of determining delays using one or more current time values included in a packet sent between packet switching devices in order to measure packet switching network latencies, which is used in one embodiment. Processing begins with process block 600, and proceeds to process block 602, wherein a packet is received and a time value is associated with the packet, typically prior to storing the packet in an ingress buffer/queue. As determined in process block 603, if the packet has a latency instrumentation shim header, then processing proceeds to process block 610; otherwise: in process block 604, the packet is classified based on information extracted from the packet and/or other information or characteristics of the packet, to identify whether or not to instrument/measure one or more delays thereon. Note, one embodiment uses an identifier included in the original packet as its instrumentation classification/flow identification (e.g., an MPLS or VPN label); while one embodiment, physically includes the, or physically includes instrumentation classification/flow identification in the packet. As determined in process block 605, if the packet is not identified to be of interest for instrumenting/measuring one or more delays thereon, then in process block 608, the packet is processed/forwarded normally, and the processing illustrated in FIG. 6 is complete as indicated by process block 609.

Otherwise, in process block 607, the current time value of the arrival at the packet switching device is added to the packet's internal encapsulation. In one embodiment, the packet classification/flow identification is also added to the packet encapsulation. In one embodiment, a sequence number is added to the packet encapsulation. In one embodiment, route identification information is added to the packet encapsulation. In one embodiment, a shim header is added to the packet at this point, and typically this information is inserted into the shim header.

As determined in process block 610, if the packet is at a position of interest for instrumentation/delay measurement purposes (e.g., such as, but not limited to those positions discussed in relation to FIGS. 1A-C and 2A-B) then in process block 612, the packet and/or one or more computer-readable media is updated to reflect a packet latency measurement based on a current time value at the corresponding position and a time value stored in the internal packet encapsulation or shim header. For example, the current time value stored in the shim header might correspond to the time the packet entered the network on a first packet switching device, and the current time value at the current position might correspond to the time that the packet is enqueued to leave the network on a second packet switching device or actually left the network from a second packet switching device. In one embodiment, one or more computer-readable media is updated to reflect whether or not, or only if, a packet was determined to be dropped based on the packet sequence number in the shim header. In one embodiment, the time value stored in the shim header is updated to allow for a new starting point for future latency measurements. In one embodiment, the current time value at the position is added to the shim header such that the shim header contains more than one time value (and subsequent processing can determine the desired packet network latency or latencies based on these time values). Next, in process block process block 614, wherein the packet is processed and forwarded as normal until this is completed or a position of interest has been reached (process block 610). In one embodiment, this processing may include removing the shim header, such as when sending the packet to a device external to the network. In one embodiment, this processing may include removing the internal packet encapsulation and adding the shim header to the packet, such as that typically performed by a packet switching device creating the packet and/or receiving the packet from a device external to the instrumented network. In one embodiment, this processing may include forwarding the packet to another device. As determined in process block 615, if processing of the packet is complete, then processing of the flow diagram of FIG. 6 is completed as represented by process block 619.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a packet switching device for determining packet delays by the packet switching device, the packet switching device including a plurality of ingress interfaces configured to perform operations including receiving packets from sources external to the packet switching device, a plurality of egress interfaces configured to perform operations including transmitting packets to destinations external to the packet switching device, and a switching mechanism configured to perform operations including switching packets received on the plurality of ingress interfaces to egress interfaces of the plurality of egress interfaces, the method comprising:

generating one or more successions of time values;

for each particular packet of a plurality of packets: routing the particular packet to a destination egress interface of the plurality of egress interfaces and transmitting from the destination egress interface the particular packet; and identifying at one or more positions other than said ingress and egress interfaces within the packet switching device a current time value of said time values and tangibly storing, in one or more computer-readable media, one or more representations based on one or more packet switching device latencies within the packet switching device for the particular packet determined using the current time value.

2. The method of claim 1, wherein a larger plurality of packets includes the plurality of packets; and wherein the method includes: classifying each packet of the larger plurality of packets arriving on the ingress interface to identify whether or not the packet is included in the plurality of packets.

3. The method of claim 1, wherein said representations based on one or more packet switching device latencies include packet counts for each of a plurality of ranges of said one or more packet switching device latencies.

4. A network including packet switching devices configured to determine delays of customer packet traffic transmitted across the network, the network comprising:

a plurality of packet switching devices communicatively coupled together, wherein each specific packet switching device of the plurality of packet switching devices is configured to generate one or more successions of time values coherently with other said packet switching devices;

wherein a first packet switching device of the plurality of packet switching devices is configured, for each particular packet of a plurality of packets received from a source external to the network, to: add a first current time value of said one or more successions of time values to said particular packet, and forward said particular packet including the first current time value to another packet switching device of the plurality of packet switching devices towards a destination external to the network; and wherein a second packet switching device of the plurality of packet switching devices is configured to receive each packet of the plurality of packets forwarded by the first packet switching device, and for each said received packet: to identify, at a position within the second packet switching device, a second current time value of said one or more successions of time values time values and tangibly storing, in one or more computer-readable media, one or more representations based on a latency for said received packet; and to strip the first current time value from said received packet and to forward said received packet, without the first current time value nor a duration derived therefrom, from the network towards the destination external to the network; wherein the latency is determined for said received packet based on the first and second current time values.

5. The network of claim 4, wherein a larger plurality of packets includes the plurality of packets; and wherein the first packet switching device is configured to classify each packet of the larger plurality of packets to identify whether or not the packet is included in the plurality of packets.

6. The network of claim 4, wherein the first packet switching device is configured to add a shim header to said particular packet, the shim header including one or more fields for communicating information including the first current time value; wherein neither an Internet Protocol nor a Layer-2 packet header of said particular packet includes the shim header; and wherein the second packet switching device is configured to strip the shim header including the first current time value from said received packet and to forward said received packet without the shim header from the network towards the destination external to the network.

7. The network of claim 6, wherein a larger plurality of packets includes the plurality of packets; and wherein the first packet switching device is configured to classify each packet of the larger plurality of packets to identify whether or not the packet is included in the plurality of packets; and if determined as one of the plurality of packets, to add a classification identification in the shim header generated based on said classification in order to differentiate from other classifications.

8. The network of claim 6, wherein the first packet switching device is configured to add a sequence number to the shim header of each of the plurality of packets forwarded by the first packet switching device; and wherein the second packet switching device is configured to update, in said one or more computer-readable media, said one or more representations based on a determination of whether or not a packet has been dropped based on the sequence numbers of said packets received by the second packet switching device.

9. The network of claim 4, wherein the first current time value added to said particular packet by the first packet switching device represents a current time of receiving said particular packet by the first packet switching device.

10. The network of claim 9, wherein said one or more positions within the second packet switching device include a position corresponding to the time of transmission of said received packet from the second packet switching device.

11. The network of claim 9, wherein the position within the second packet switching device corresponds to the time of enqueuing of said received packet to an egress packet processing engine prior to the time of transmission of said received packet from the second packet switching device.

12. The network of claim 4, wherein the particular packet is created by the first packet switching device and not received from another device, and the plurality of packets includes said created particular packet.

13. The network of claim 4, wherein each of the plurality of packet switching devices is a bridge or router.

14. The network of claim 4, wherein said representations include one or more packet counts for each of a plurality of ranges of latencies.

15. The network of claim 14, wherein the plurality of ranges of latencies are determined based on one or more customer service level agreements (SLAs) for determining compliance with said SLAs.

16. A packet switching device, comprising:

a plurality of interfaces configured for sending and receiving packets;

a switching mechanism configured to switch packets among the plurality of interfaces; and a time value generator configured to generate one or more successions of time values;

wherein the packet switching device is configured to:
receive a first packet on one of the plurality of interfaces;
to embed a first current time value of said one or more successions of time values in the first packet; and to forward the first packet, including said embedded first current time value, out of a different one of the plurality of interfaces; and wherein the packet switching device is configured: to receive a second packet including a second embedded time value on one of the plurality of interfaces; to identify at one or more positions within the packet switching device a current time value of said one or more successions of time values corresponding to a position within the packet switching device of the second packet; to determine one or more packet switching network latencies for the second packet based on its said second embedded time value and one or more of said current time values said identified for the second packet; to store, in one or more computer-readable media, representations based on said one or more packet switching network latencies for the second packet; and to forward the second packet without the second embedded time value from a different one of the plurality of interfaces.

17. The packet switching device of claim 16, wherein the packet switching device is configured to said embed the first current time value in the first packet by adding a shim header to the first packet with the shim header including the first current time value; and wherein the second packet includes a second shim header including the second embedded time value; and wherein the packet switching device is configured to strip the second shim header from the second packet before said forwarding the second packet from said different one of the plurality of interfaces.

18. A method performed by a packet switching device of a network of a communicatively-coupled plurality of packet switching devices, wherein the network of packet switching devices is communicatively coupled to one or more external networks; the method comprising:

generating one or more successions of time values coherently with said other packet switching devices of the plurality of packet switching devices;

receiving a first packet from one of said external networks; embedding a current time value of said time values in the first packet; and forwarding the first packet including said embedded current time value to another of said packet switching devices; and receiving a second packet including an embedded time value received from another of said packet switching devices in the network; identifying at one or more positions within the packet switching device a current time value of said time values corresponding to a position within the packet switching device of the second packet; determining one or more packet switching network latencies for the second packet based on its said embedded time value and one or more of said current time values said identified for the second packet; storing, in one or more computer-readable media, representations based on said one or more packet switching network latencies for the second packet; and forwarding the second packet without the embedded time value to another device in said one or more external networks.

19. The method of claim 18, wherein said embedded current time value in the first packet represents a current time of receiving the first packet by the packet switching device.

* * * * *